(12) United States Patent
Yang et al.

(10) Patent No.: US 10,681,740 B2
(45) Date of Patent: Jun. 9, 2020

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Jiwon Kang, Seoul (KR); Hyunsoo Ko, Seoul (KR); Kijun Kim, Seoul (KR); Eunsun Kim, Seoul (KR); Joonkui Ahn, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/084,958

(22) PCT Filed: Mar. 16, 2017

(86) PCT No.: PCT/KR2017/002863
§ 371 (c)(1),
(2) Date: Sep. 13, 2018

(87) PCT Pub. No.: WO2017/160107
PCT Pub. Date: Sep. 21, 2017

(65) Prior Publication Data
US 2019/0104550 A1    Apr. 4, 2019

Related U.S. Application Data

(60) Provisional application No. 62/308,927, filed on Mar. 16, 2016, provisional application No. 62/334,432, filed on May 10, 2016.

(51) Int. Cl.
*H04W 72/04* (2009.01)
*H04W 72/12* (2009.01)
(Continued)

(52) U.S. Cl.
CPC ...... *H04W 74/0833* (2013.01); *H04B 7/0695* (2013.01); *H04B 7/088* (2013.01);
(Continued)

(58) Field of Classification Search
CPC .............. H04W 74/00; H04W 74/0833; H04L 25/0226; H04B 7/0695
(Continued)

(56) References Cited

U.S. PATENT DOCUMENTS

2012/0106486 A1* 5/2012 Agarwal ............... H04L 1/0026
370/329
2012/0106489 A1* 5/2012 Konishi ............. H04W 72/048
370/329
(Continued)

FOREIGN PATENT DOCUMENTS

| KR | 1020070117928 | 12/2007 |
|---|---|---|
| KR | 1020150000304 | 1/2015 |
| WO | 2016004994 | 1/2016 |

OTHER PUBLICATIONS

PCT International Application No. PCT/KR2017/002863, Written Opinion of the International Searching Authority dated Jun. 19, 2017, 22 pages.
(Continued)

*Primary Examiner* — Asad M Nawaz
*Assistant Examiner* — Jason A Harley
(74) *Attorney, Agent, or Firm* — Lee Hong Degerman Kang Waimey

(57) ABSTRACT

The present invention relates to a wireless communication system and, particularly, to a method and an apparatus therefor, the method comprising the steps of: transmitting N (N>1) first RA signals during a first interval; monitoring a response signal to the multiple first RA signals; and performing a process for transmitting N second RA signals
(Continued)

during a second interval after monitoring of the response signal fails, wherein RA signals in each interval are transmitted in the same transmission beam direction and RA signals in different intervals are transmitted in different transmission beam directions.

12 Claims, 11 Drawing Sheets

(51) Int. Cl.

| | | |
|---|---|---|
| *H04W 74/08* | (2009.01) | |
| *H04W 74/00* | (2009.01) | |
| *H04W 74/04* | (2009.01) | |
| *H04B 7/08* | (2006.01) | |
| *H04B 7/06* | (2006.01) | |
| *H04L 5/00* | (2006.01) | |
| *H04L 25/02* | (2006.01) | |
| *H04W 24/08* | (2009.01) | |
| *H04W 52/50* | (2009.01) | |
| *H04W 52/32* | (2009.01) | |
| *H04W 52/48* | (2009.01) | |
| *H04W 52/14* | (2009.01) | |

(52) U.S. Cl.
CPC ........ *H04L 5/0048* (2013.01); *H04L 25/0226* (2013.01); *H04W 24/08* (2013.01); *H04W 72/04* (2013.01); *H04W 72/042* (2013.01); *H04W 72/0446* (2013.01); *H04W 72/0453* (2013.01); *H04W 74/00* (2013.01); *H04W 74/08* (2013.01); *H04W 74/0891* (2013.01); *H04L 5/001* (2013.01); *H04W 52/146* (2013.01); *H04W 52/325* (2013.01); *H04W 52/48* (2013.01); *H04W 52/50* (2013.01)

(58) Field of Classification Search
USPC .......................................................... 370/329
See application file for complete search history.

(56) References Cited

U.S. PATENT DOCUMENTS

| | | | |
|---|---|---|---|
| 2012/0314664 | A1 | 12/2012 | Johansson et al. |
| 2013/0010711 | A1* | 1/2013 | Larsson ............ H04W 56/0005 370/329 |
| 2013/0258885 | A1* | 10/2013 | Yu ......................... H04W 16/28 370/252 |
| 2014/0376466 | A1* | 12/2014 | Jeong ................ H04W 74/0833 370/329 |
| 2015/0003355 | A1* | 1/2015 | Dalsgaard ............ H04W 76/19 370/329 |
| 2016/0007343 | A1 | 1/2016 | Yang et al. |
| 2017/0332407 | A1* | 11/2017 | Islam ................. H04W 52/242 |

OTHER PUBLICATIONS

European Patent Office Application Serial No. 17767008.0, Search Report dated Jul. 23, 2019, 9 pages.

* cited by examiner

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2017/002863, filed on Mar. 16, 2017, which claims the benefit of U.S. Provisional Application No. 62/308,927, filed on Mar. 16, 2016, and 62/334,432, filed on May 10, 2016, the contents of which are all hereby incorporated by reference herein in their entirety.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In one aspect of the present invention, there is provided a method for transmitting a signal by a user equipment (UE) in a wireless communication system, the method comprising: transmitting N (N>1) first random access (RA) signals during a first duration; monitoring a response signal (RAR) to the plurality of first RA signals; and after the monitoring of the RAR is failed, transmitting N second RA signals during a second duration, wherein RA signals within the same duration are transmitted in the same transmit beam direction, wherein RA signals within different durations are transmitted in different transmit beam directions.

In another aspect of the present invention, there is provided a user equipment (UE) for use in a wireless communication system, the UE comprising: a radio frequency (RF) module; and a processor, wherein the processor is configured to: transmit N (N>1) first random access (RA) signals during a first duration; monitor a response signal (RAR) to the plurality of first RA signals; and after the monitoring of the RAR is failed, transmit N second RA signals during a second duration, wherein sounding reference signal (SRS) symbols within the same orthogonal frequency division multiple access symbol (OFDMA symbol) are transmitted in the same transmit beam direction, wherein SRS symbols within different OFDMA symbols are transmitted in different transmit beam directions.

Preferably, transmission powers for RA signals within the same duration may be the same, wherein the transmission power for the RA signals in the second duration may be configured to be higher than the transmission power for the RA signals in the first duration.

Preferably, the RAR may be individually monitored for each RA signal transmission.

Preferably, when a response signal to a K-th (K<N) RA signal transmission in the second duration is successfully received, transmissions of RA signals subsequent to the K-th RA signal transmission within the second duration may be skipped.

Preferably, a resource used for transmission of each RA signal may be determined using a base station (BS) transmit beam ID obtained from a base station.

Preferably, the RA signal may include a Physical Random Access Channel (PRACH).

Advantageous Effects

According to the present invention, wireless signal transmission and reception can be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
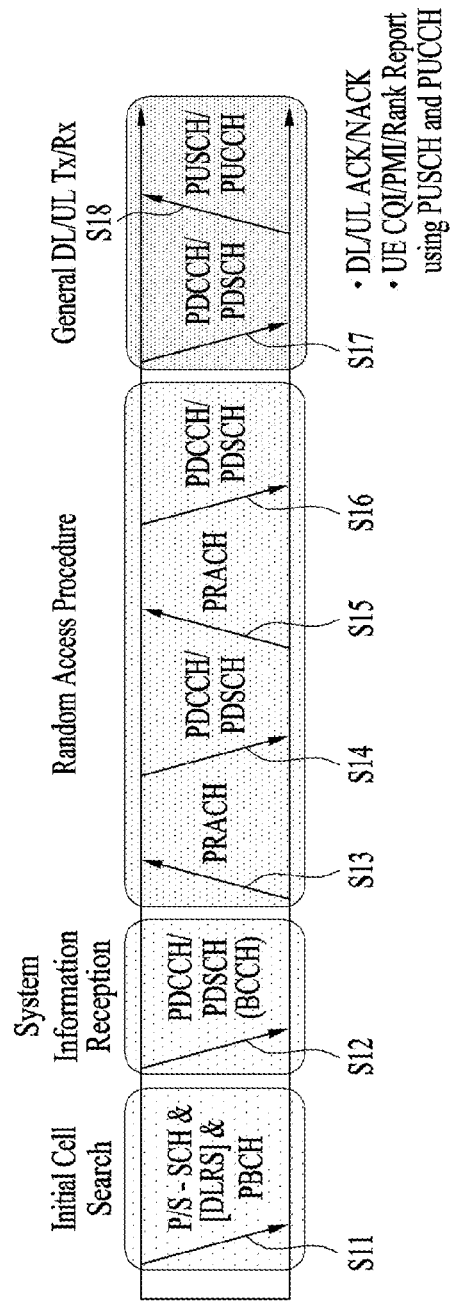
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
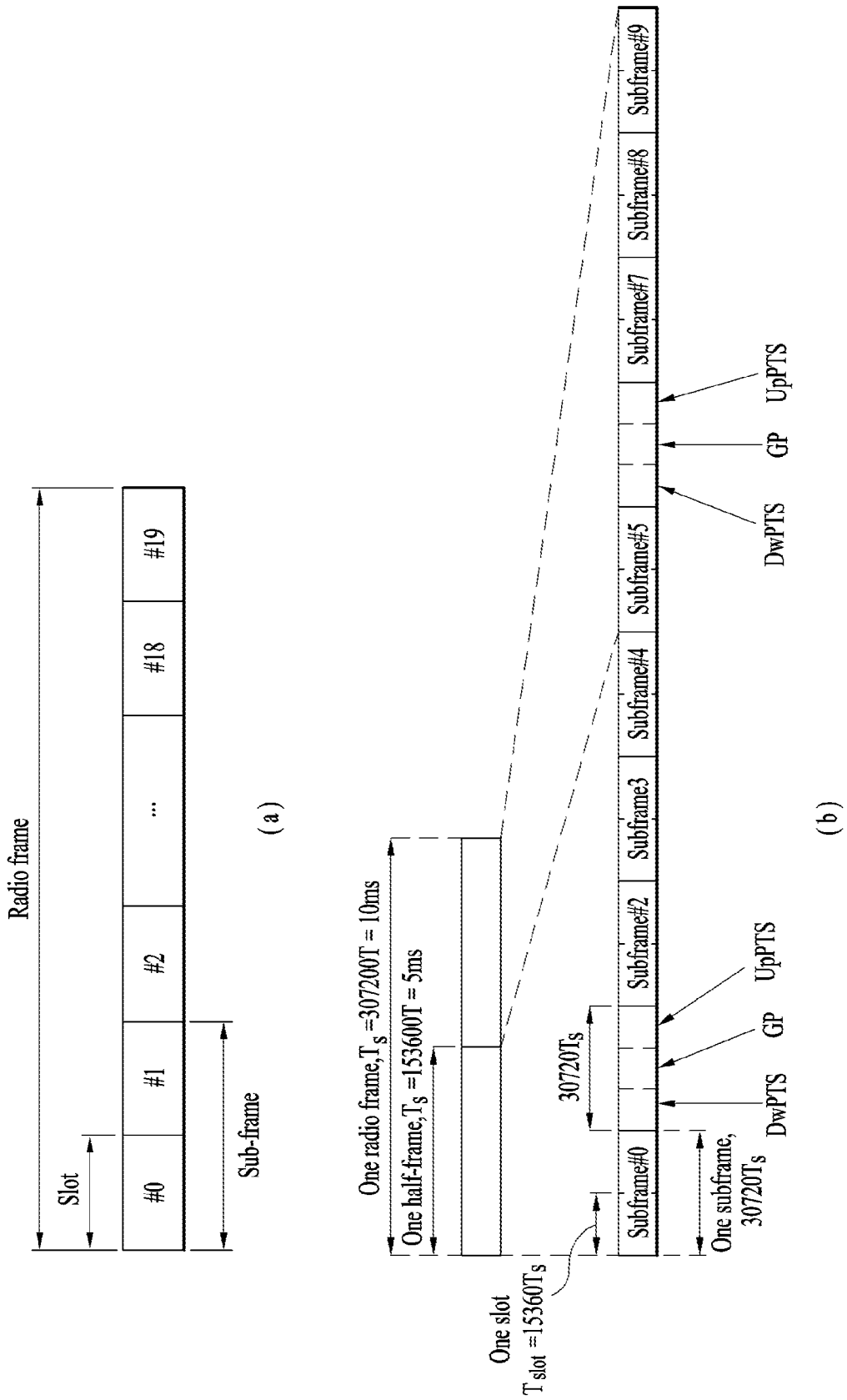
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one 01-DM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
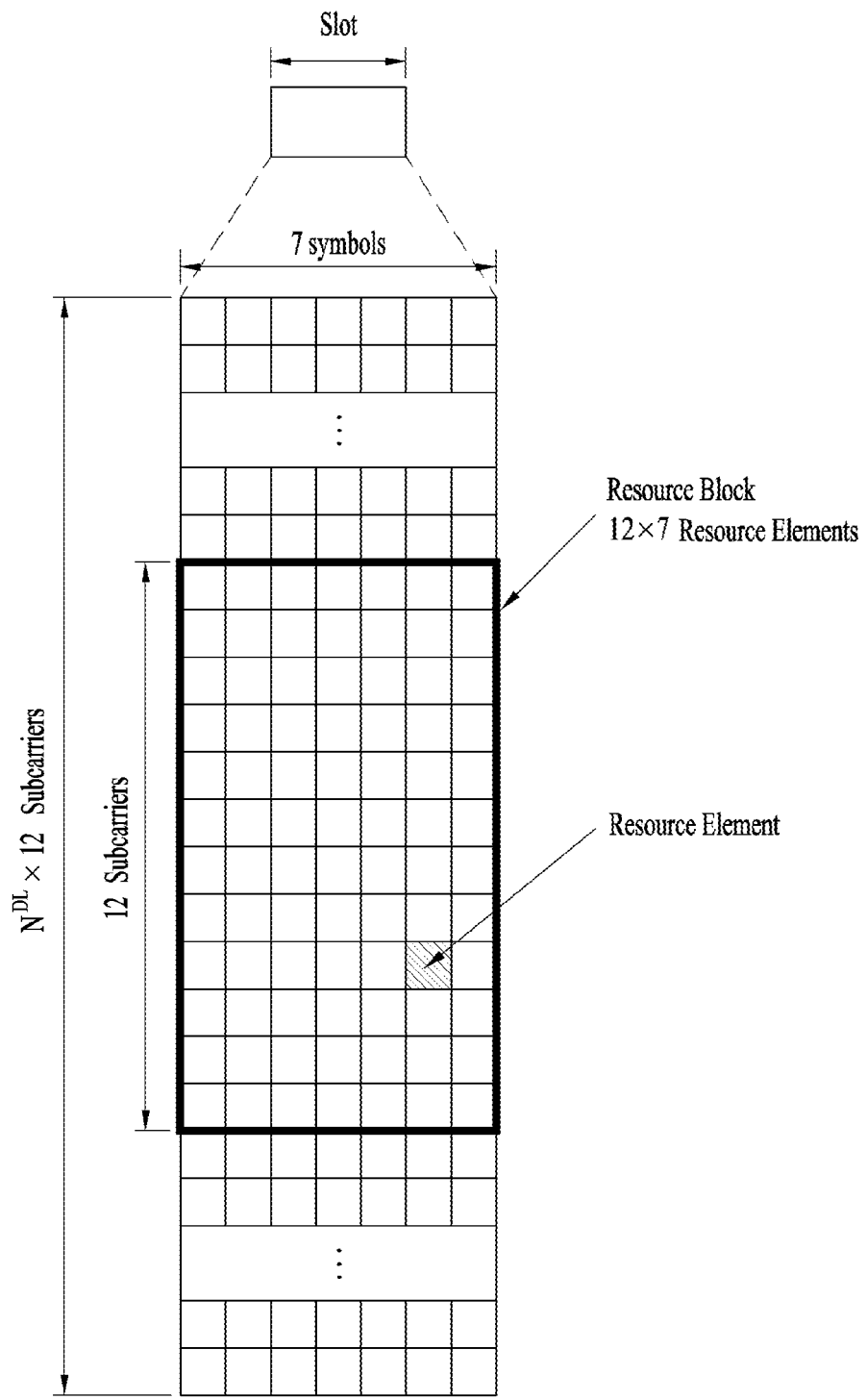
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
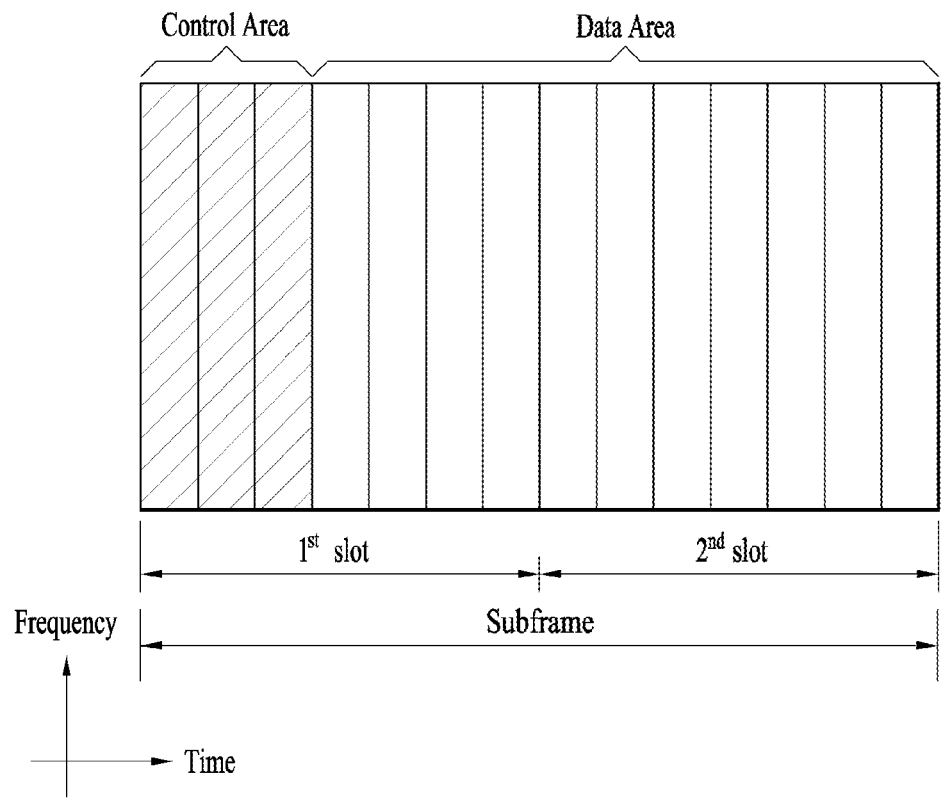
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |

TABLE 2-continued

| PDCCH format | Number of CCEs (n) | Number of REGs | Number of PDCCH bits |
|---|---|---|---|
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
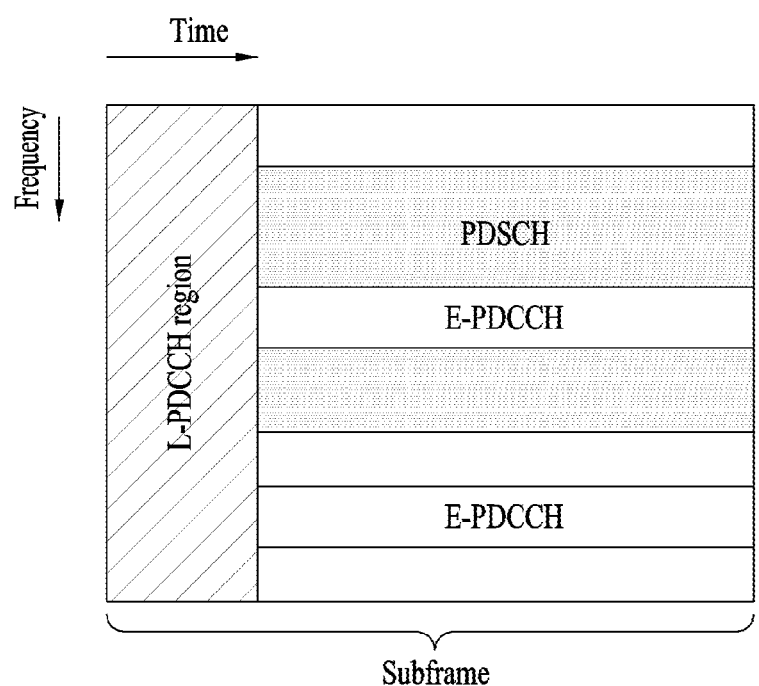
FIG. 5 illustrates an example of an Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port 5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
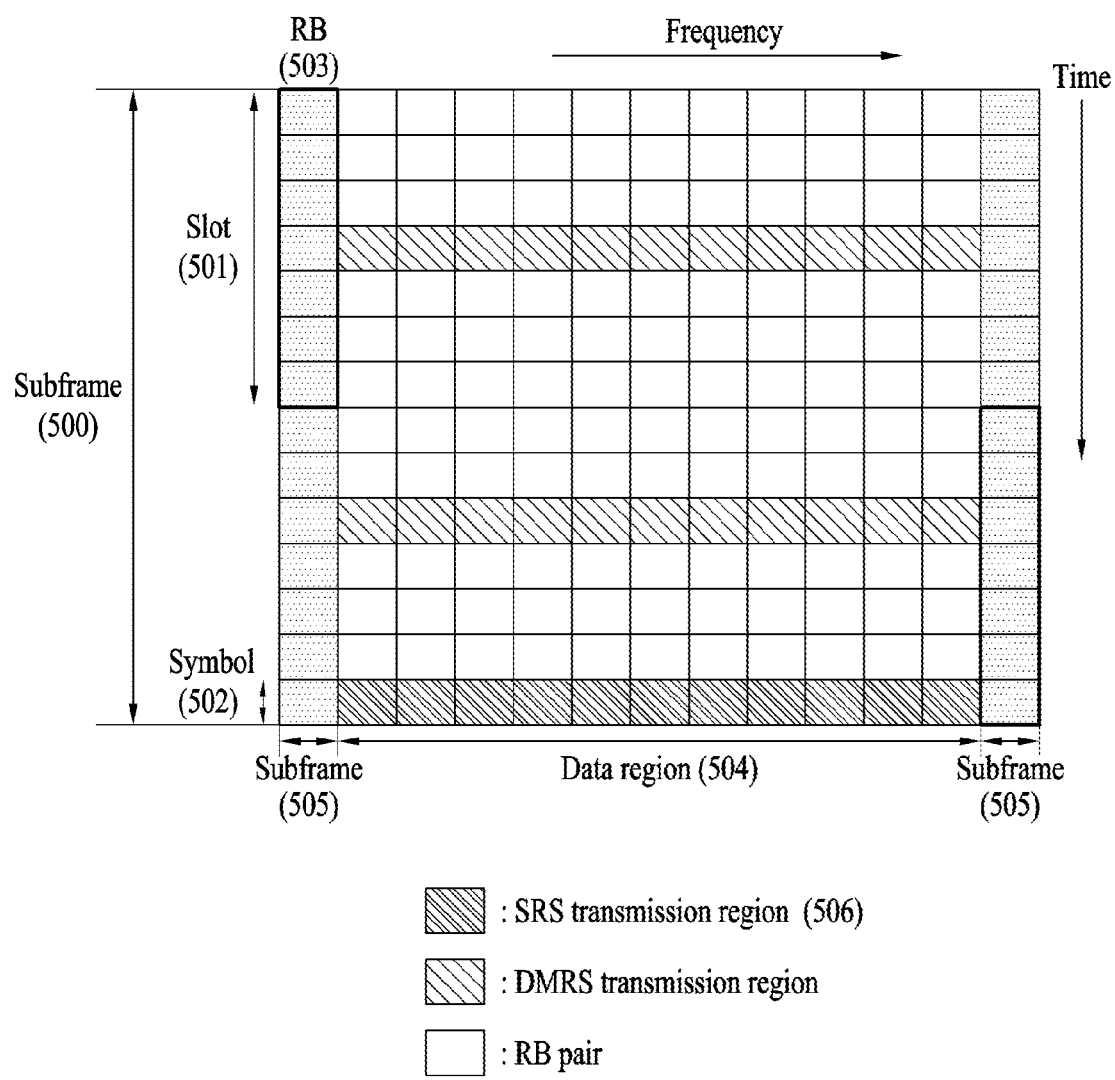
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Scheduling for UL transmission in LTE is enabled only if UL transmission timing of a user equipment is synchronized. A random access procedure is used for various usages. For instance, a random access procedure is performed in case of an initial network access, a handover, a data occurrence or the like. A user equipment may be able to obtain UL synchronization via the random access procedure. Once the UL synchronization is obtained, a base station may be able to allocate a resource for UL transmission to the corresponding user equipment. The random access procedure may be classified into a contention based procedure and a non-contention based procedure.

Figure 7:
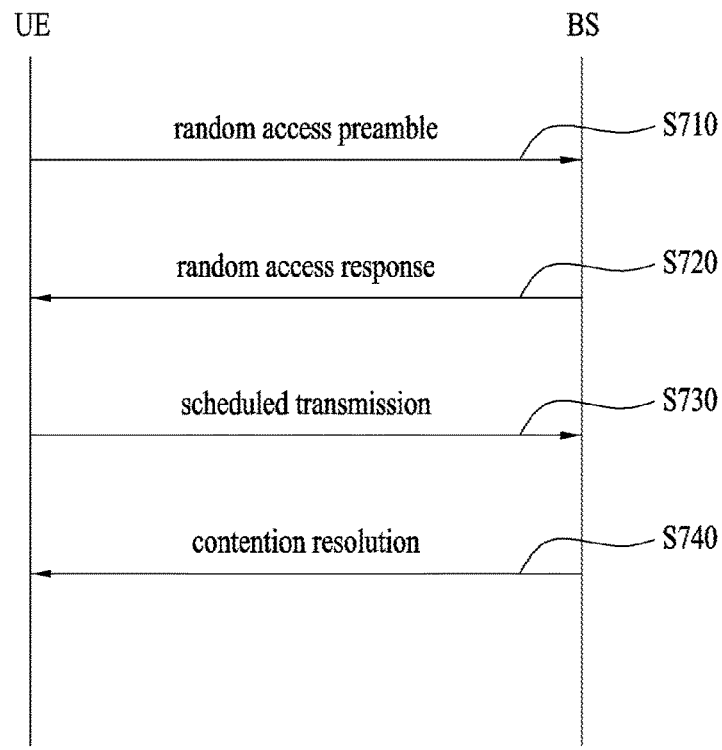
FIG. 7 and FIG. 8 illustrate examples of a random access procedure.

FIG. 7 is a diagram for one example of a contention based random access procedure.

Referring to FIG. 7, a user equipment receives information on a random access from a base station via system information. Thereafter, if the random access is required, the user equipment transmits a random access preamble (or a message 1) to the base station [S710]. Once the base station receives the random access preamble from the user equipment, the base station sends a random access response message (or, a message 2) to the user equipment [S720]. In particular, a DL scheduling information on the random access response message may be transmitted on L1/L2 control channel (PDCCH) by being CRC masked with RA-RNTI (random access-RNTI). Having received the RA-RNTI masked DL scheduling signal, the user equipment receives the random access response message on PDSCH and may be then able to decode the received random access response message. Subsequently, the user equipment checks whether a random access response information indicated to the user equipment is included in the received random access response message. In doing so, a presence or non-presence of the random access response information indicated to the user equipment may be checked in a manner of checking whether RAID (random access preamble ID) for the preamble having transmitted by the user equipment is present or not. The random access response information may include a timing advance indicating a timing offset information for synchronization, a radio resource allocation information on a resource used in UL, a temporary identifier (e.g., T-RNTI) for user equipment (UE) identification and the like. Once the random access response information is received, the user equipment sends a UL message (or, a message 3) on UL SCH (uplink shared channel) in accordance with the radio resource allocation information included in the received random access response information [S730]. Having received the UL message from the user equipment in the step S730, the base station sends a contention resolution message (or, a message 4) to the user equipment [S740].

Figure 8:
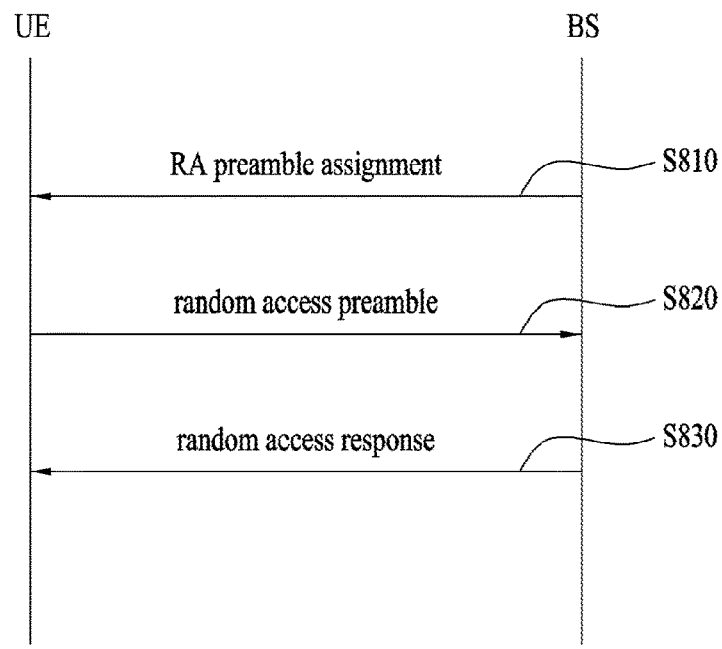

FIG. 8 is a diagram for one example of a non-contention based random access procedure. A non-contention based random access procedure may be used in a handover procedure or may exist if requested by an order given by a base station. A basic procedure is as good as a contention based random access procedure.

Referring to FIG. 8, a user equipment receives assignment of a random access preamble (i.e., a dedicated random access preamble) for the user equipment only from a base station [S810]. A dedicated random access preamble indication information (e.g., a preamble index) may be included in a handover command message or may be received on PDCCH. The user equipment transmits the dedicated random access preamble to the base station [S820]. Thereafter, the user equipment receives a random access response from the base station [S830] and the random access procedure is ended.

In order to indicate a non-contention based random access procedure with a PDCCH order, DCI format 1A is used. And, the DCI format 1A may be used for compact scheduling for one PDSCH codeword. The following information is transmitted using the DCI format 1A.

Flag for identifying DCI format 0 or DCI format 1A: This flag is 1-bit flag. A flag value '0' indicates DCI format 0 and a flag value '1' indicates DCI format 1A.

If all the fields remaining after scrambling CRC of DCI format 1A with C-RNTI are set as follows, the DCI format 1A may be used for a random access procedure according to a PDCCH order.

Localized/distributed VRB (virtual resource block) assignment flag: This flag is 1-bit flag. This flag is set to 0.

Resource block assignment information: $\lceil \log_2(N_{RB}^{DL}(N_{RB}^{DL}+1)/2) \rceil$. Every bit is set to 1.

Preamble index: 6 bits

PRACH mask index: 4 bits

All the remaining bits for compact scheduling of PDSCH in DCI format 1A are set to 0.

Figure 9:
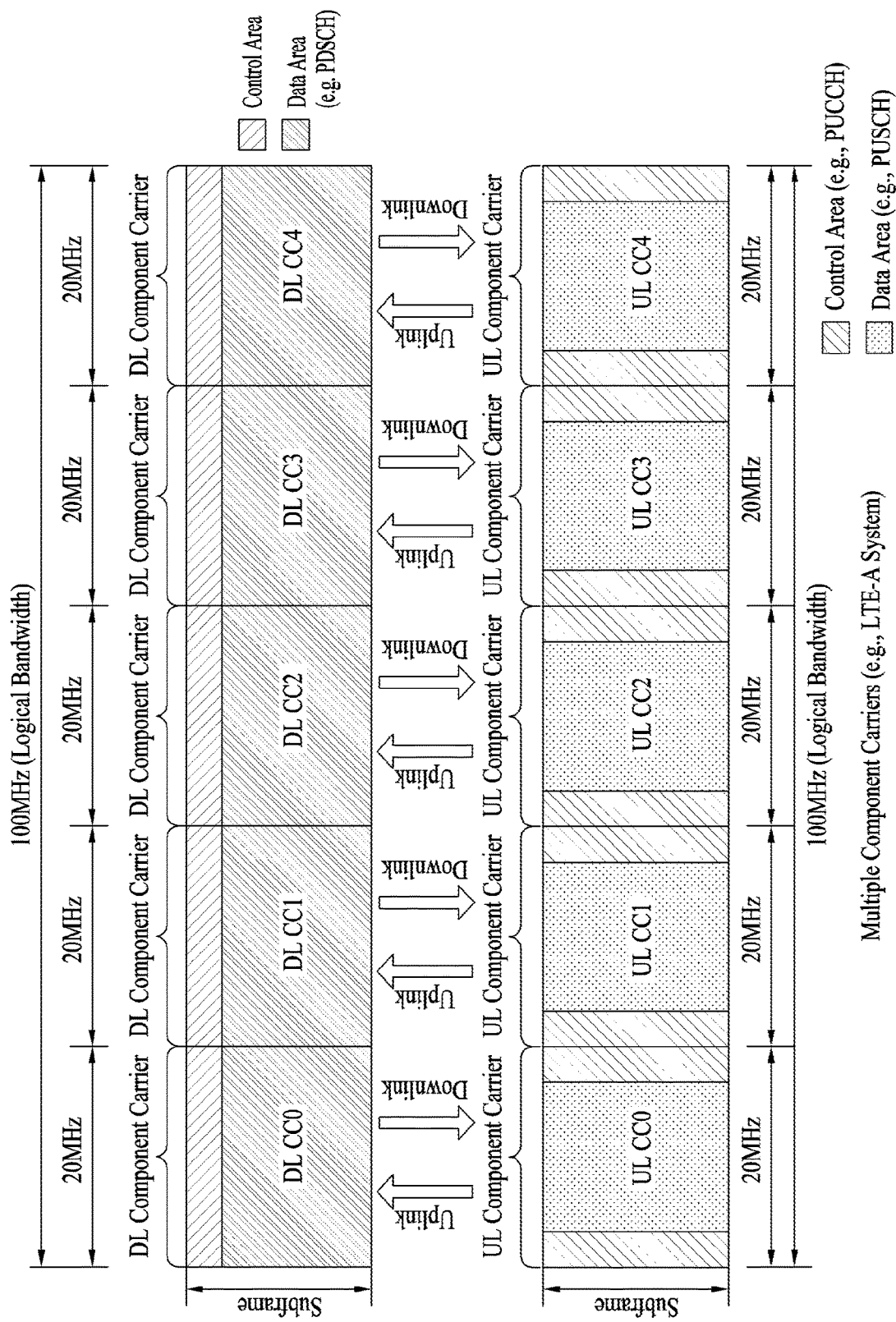
FIG. 9 illustrates a carrier aggregation (CA)-based wireless communication system.

FIG. 9 illustrates carrier aggregation (CA) communication system.

Referring to FIG. 9, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 10:
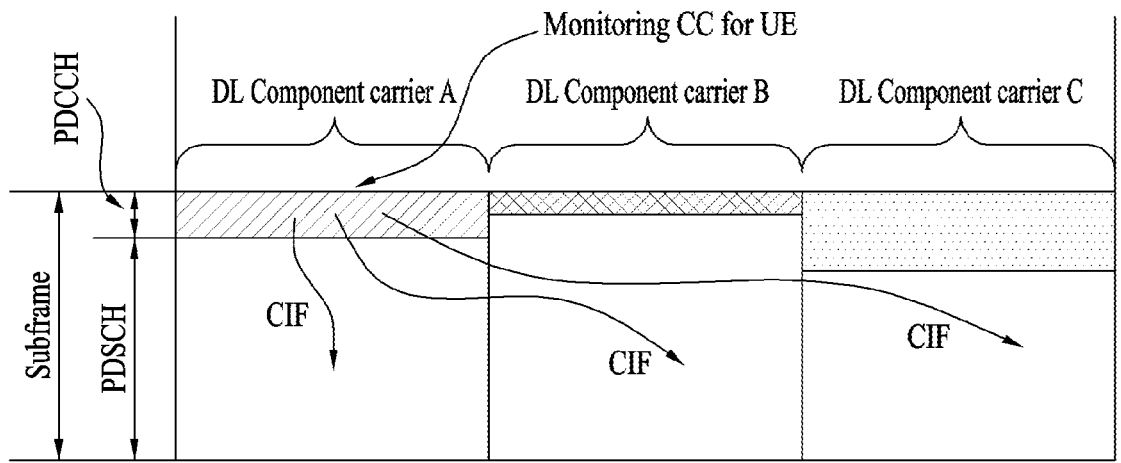
FIG. 10 illustrates cross-carrier scheduling.

FIG. 10 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Furthermore, in a millimeter wave (mmW) system, a wavelength of a signal is short, so that a multitude of antennas can be installed in the same area. For example, since the wavelength is 1 cm in a 30 GHz band, a total of 100 antenna elements can be installed in a 5-by-5 cm2 panel in a form of a two-dimensional array with a 0.5λ (wavelength) spacing. Therefore, in the mmW system, a plurality of antenna elements are used to increase a beamforming (BF) gain to increase a coverage or increase a throughput.

In this connection, when each antenna element has a TXRU (transceiver unit) so that transmission power and phase can be adjusted for each antenna element, independent beamforming may be realized for each frequency resource. However, installing each TXRU in each of all 100 antenna elements is ineffective in terms of cost. Therefore, a scheme of mapping a plurality of antenna elements to one TXRU and adjusting a direction of the beam with an analog phase shifter is considered. This analog beamforming scheme may form only one beam direction in a full band, and has a disadvantage that a frequency selective beam cannot be achieved. Thus, as an intermediate form between digital BF and analog BF, a hybrid BF in which B TXRUs map to Q antenna elements (B<Q) may be considered. In this case, a number of directions of a beam in which the beam is simultaneously transmitted is limited to a number smaller than or equal to B, though it varies depending on a connection scheme between the B TXRUs and Q antenna elements.

Figure 11:
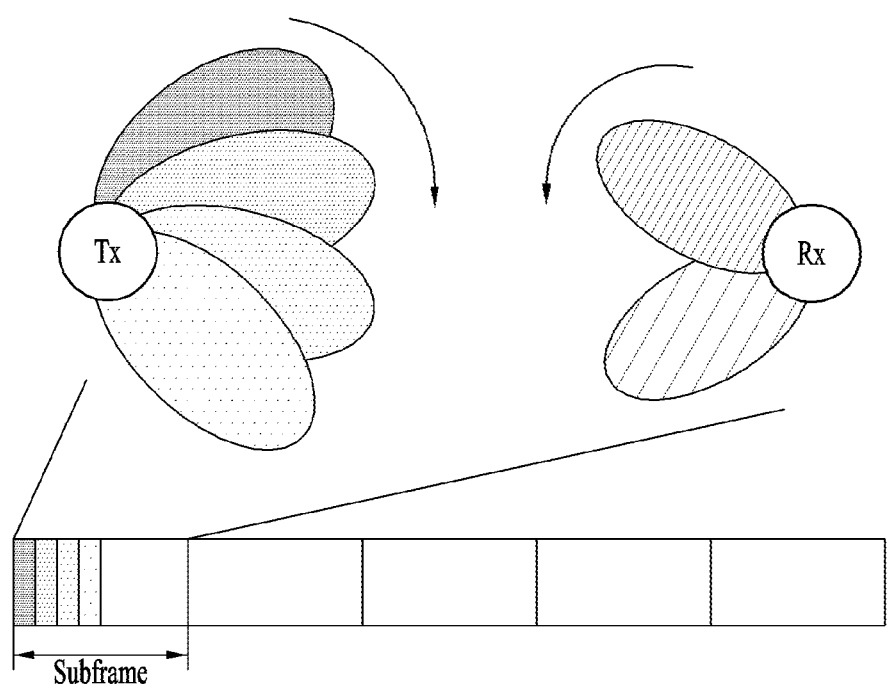
FIG. 11 illustrates analog beamforming.
Figure 12:
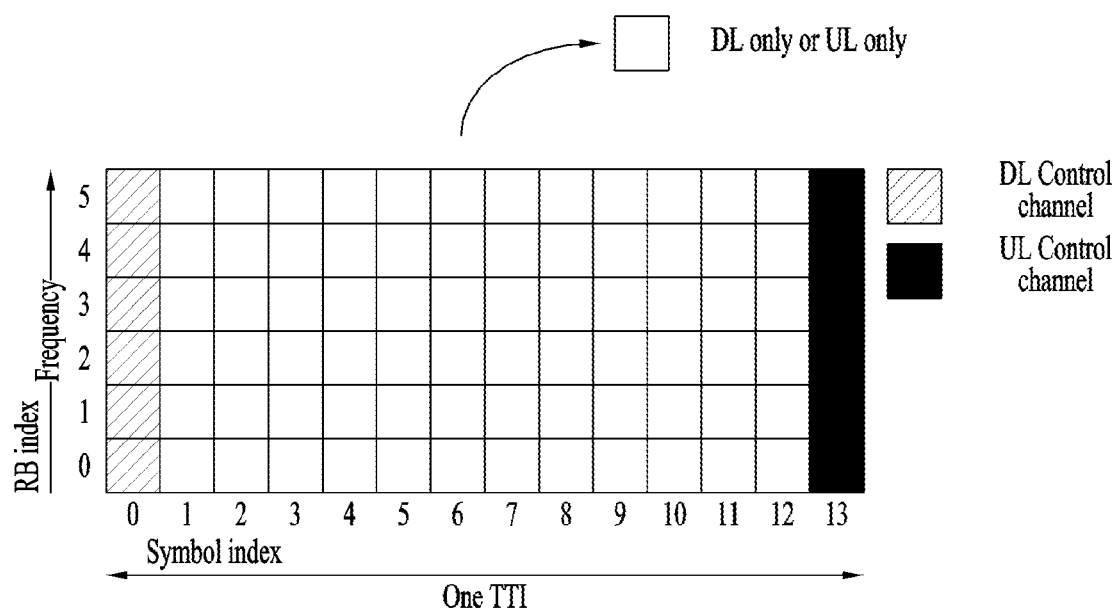
FIG. 12 illustrates a structure of a self-contained subframe.

FIG. 11 illustrates analog beamforming. Referring to FIG. 10, a transmitter may transmit a signal while changing a direction of the beam over time (transmit beamforming). A receiver may also receive a signal while changing a direction of the beam over time (receive beamforming). Within a certain time interval, (i) directions of the transmit and receive beams may change simultaneously over time, (ii) a direction of the transmit beam may be fixed over time, while only a direction of the receive beam may change over time, or (iii) a direction of the receive beam may be fixed over time, while only a direction of the transmit beam may change over time.

In next-generation RAT (Radio Access Technology), a self-contained subframe is considered in order to minimize data transmission latency. FIG. 11 illustrates a self-contained subframe structure. In FIG. 11, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+UL control period

DL control period+DL data period

DL control period+GP+UL data period+UL control period

DL control period+GP+UL data period

A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Embodiment

In the new RAT system, it is likely that the base station (BS) will operate to perform TX/RX (analog or hybrid) beam-forming for DL/UL signal transmission/reception based on the mmW characteristic. First, in a case of a DL, a base station may transmit a plurality of specific user equipment-common signals (for example, synchronous signals or reference signals) having different beam directions (for example, beam ID or index) in a predetermined duration (TX-beam sweeping by base station). A user equipment (UE) may scan the TX beams to report to the base station information (for example, beam ID or index) about a preferred beam that is most optimal (that is, has good quality) among the received specific signals (that is, beam directions) (RX-beam sweeping by user equipment). Conversely, in the case of UL, it may be necessary for the BS to scan the RX-beams to determine the best beam direction in which the base station receives a specific signal transmitted from the user equipment (this is contrary to the DL case).

Hereinafter, an effective configuration/transmission method of an UL Random Access preamble/channel signal (hereinafter referred to as PRACH) (for example, PRACH) with considering the RX-beam scanning operation in the new RAT system, and a user equipment operation scheme for performing the method will be proposed. For the convenience of explanation, followings are defined depending on 1) which is a subject to perform the beam scanning (for example, base station, and user equipment); and 2) which is a beam scanning direction (for example, transmit (TX), and receive (RX)).

1) base station TX-beam scanning: The base station performs transmit beam scanning on the (DL) signal (for example, sync signal) to the user equipment.

2) base station RX-beam scanning: The base station performs receive beam scanning on the (UL) signal (for example, RA signal) from the user equipment.

3) user equipment TX-beam scanning: The user equipment performs transmit beam scanning on the (UL) signal (for example, RA signal) to the base station.

4) user equipment RX-beam scanning: The user equipment performs receive beam scanning on the (DL) signal (for example, sync signal) from the base station.

5) TX-beam ID (or index): The index used by the transmitting node to distinguish TX-beams formed of different antenna port combinations.

For the base station RX-beam scanning, the user equipment configures a multiple RA signal and repeatedly transmits the RA signal within a predetermined duration.

For the RX-beam scanning by the base station, the UE may operate to repeatedly N times transmit a RA signal configured using the same UL resource (for example, the same sequence/code and/or frequency resource) within a predetermined (time) duration (hereinafter, beam-scan duration) (N>1). In this connection, the beam-scan duration may be configured using a number of subframes (i.e., SFs) and a plurality of OFDM symbols (i.e., OSs). The number N of RA signals repeatedly transmitted within the beam-scan duration may be signaled to the user equipment via transmission of system information such as PBCH/SIB (at the initial access stage). Alternatively, the number N may be dynamically indicated via an RA signal transmission command signal, such as a PDCCH order (in the RRC connected state). In this connection, N represents the number of the RX beam directions (for example, beam IDs or indices) (or RX-antenna port combinations) of the base station. The N RA signals transmitted from the user equipment within a single beam-scan duration may all be transmitted in the same TX beam direction (for example, the same beam ID or index) (or the same TX-antenna port combination).

The following two RA signal transmission methods (and associated user equipment operation schemes) may be considered based on whether the same N RA signals (resources) are configured (relatively) continuously or discontinuously within the beam-scan duration in the time domain.

(1) Method 1: Method for Continuously Transmitting the Same N RA Signals

Figure 13:
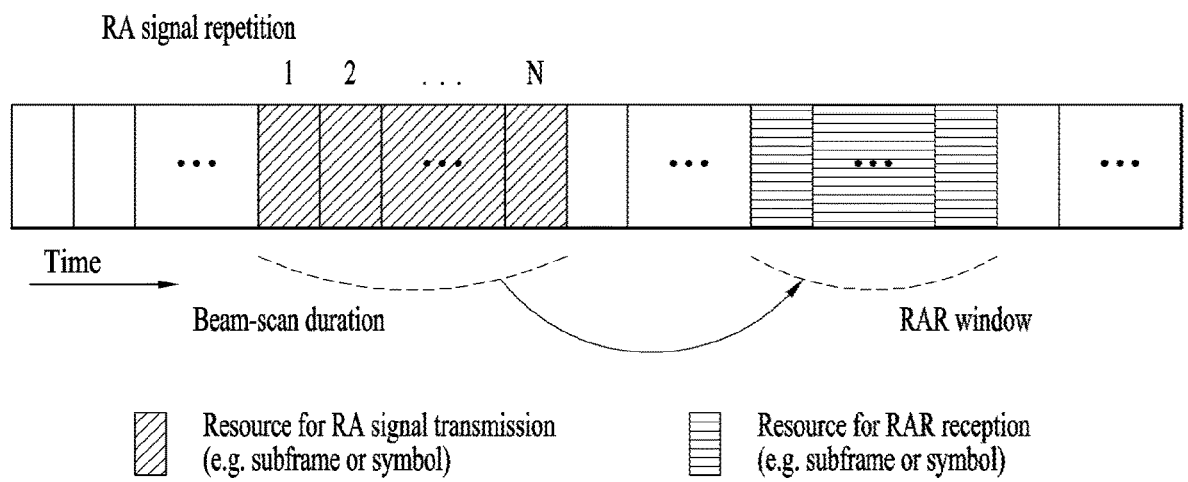
FIGS. 13 to 14 illustrate a random access procedure according to the present invention.

This method may be a scheme for continuously transmitting the same N RA signals (resources) (for example, over a set of consecutive SFs, a set of SFs whose SF spacing is smaller than the specific number of SFs, or a set of consecutive OSs). FIG. 13 illustrates the random access procedure according to this method. Referring to the drawing, a set of consecutive SFs (1, 2, ..., N) or a set of consecutive OSs (1, 2, ..., N) over which the N RA signals are repeatedly transmitted may be defined as a single beam-duration. The beam-scan duration may be configured periodically at a specific period. The specific period may be configured, for example, to be larger than the beam-scan duration (or the duration including the corresponding RAR (RA response) window). In this situation, the user equipment may repeatedly transmit the same N RA signals (resources) during the single beam-scan duration. The UE may be operable to attempt RAR detection/reception for a predetermined duration (hereinafter referred to as RAR window) from a specific time after the beam-scan duration. In one embodiment, when transmission of N RA signals corresponding to a single RAR may be referred to as a repeated RAS transmission, a single repeated RAS may be limited to be transmitted within a single beam-scan duration. Accordingly, an operation in which the single repeated RAS is transmitted over a plurality of beam-scan durations may not be allowed.

In one embodiment, when the UE fails RAR detection/reception corresponding to N repeated transmissions of the RA signals during a specific beam-scan duration, the user equipment then repeatedly N times transmits the RA signals within another beam-scan duration. In this way, the UE may attempt to retransmit the RA signal for UL random access. In one embodiment, a starting point of each beam-scan duration, i.e., a first SF in the corresponding beam-scan duration may be determined based on the system frame number and/or SF number. Alternatively, the starting point or the first SF may be signaled/configured via transmission of system information (e.g., PBCH/SIB), or RA signal transmission command signal (e.g., PDCCH order). Further, a RAR window size may be determined differently depending on the number N of RA signals repeatedly transmitted (for example, the size is determined proportionally to the N value). Alternatively, the size may be signaled/configured via transmission of system information such as PBCH/SIB or the RA signal transmission command signal such as a PDCCH order. Further, a power ramping (i.e., power increase) for the RA signal transmission may be performed on a repeated RAS basis. For example, when the UE fails to detect/receive the RAR corresponding to the repeated RAS as initially transmitted, the user equipment may operate to increase the transmit power for the repeated RAS that is subsequently (re)transmitted. Further, transmits powers for RA signals within the same repeated RAS may be configured identically.

(2) Method 2: Method for Discontinuously Transmitting the Same N RA Signals

Figure 14:
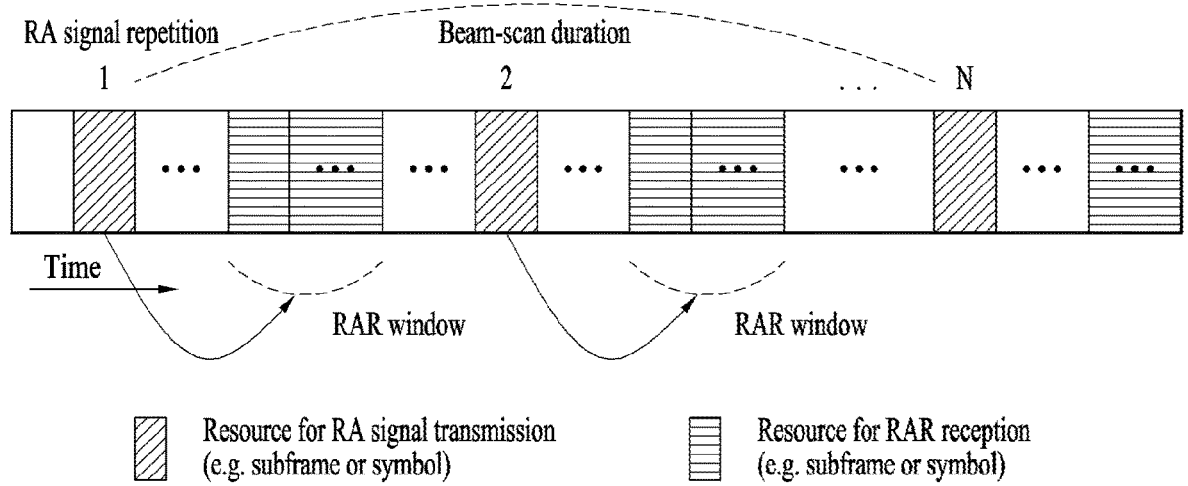

This method may be a scheme for transmitting the same N RA signals (resources) discontinuously (for example, over a set of SFs whose SF spacing is greater than the specific number of SFs). FIG. 14 illustrates a random access procedure according to this method. Referring to the drawing, a SF (hereinafter referred to as one-RAS SF) (1, 2, ..., N) to which a (single) RA signal transmission is performed N times may be periodically configured at a specific period. In this case, a single set of consecutive N one-RAS SFs may be defined as the beam-scan duration. The specific period may be configured to be greater than a duration including one-RAS SF and a RAR window therefrom. The user equipment sequentially transmits the RA signal over each one-RAS SF within the beam-scan duration. The UE may operate to detect/receive a RAR, for one-RAS SF over which the RA signal is transmitted, during a RAR window including a specific point in time after the corresponding one-RAS SF and a predetermined duration therefrom. When the user equipment first succeeds in detection/reception of the RAR to RA signal transmission in a K-th (1=K=N) one-RAS SF in the beam-scan duration, the user equipment may be configured to skip the RA signal transmissions in the remaining (N−K) one-RAS SFs within the beam-scan duration (and to perform the Msg3 transmission as scheduled by the RAR).

In one embodiment, When the UE fails to detect/receive all of the RARs corresponding to the N RA signal transmissions during the beam-scan duration, the user equipment may then perform an RA signal retransmission over another subsequent beam-scan duration. In this way, the UE may attempt to retransmit the RA signal for UL random access. In one embodiment, the starting point of each beam-scan duration, i.e., the first one-RAS SF in the corresponding beam-scan duration may be determined based on the system frame number and/or SF number. Alternatively, the starting point or the first one-RAS SF may be signaled/configured via system information (e.g., PBCH/SIB) transmission, or RA signal transmission command signal (for example, PDCCH order). Further, the RAR window size may be determined differently (for example, the size is inversely proportional to the N value) depending on the number N of RA signals as repeatedly transmitted. Alternatively, the size may be signaled/configured via transmission of system information such as a PBCH/SIB or an RA signal transmission command signal such as a PDCCH order. Further, the power ramping (i.e., power increase) for the RA signal transmission may be performed as follows: (i) the ramping may be performed on a beam-scan duration basis, similar to Method 1 above (In this connection, the transmit powers for RA signals within the same duration are all configured to remain the same); (ii) the ramping may be performed on a RA signal basis regardless of the beam-scan duration (for example, when the UE fails to detect/receive the RAR corresponding to the first RA signal, the UE may be operate to increase the transmit power for the RA signal to be subsequently (re)transmitted. In the case (ii), the transmit power for the RA signal may be initialized to the lowest value for each beam-scan duration. For example, the transmit power for the RA signal may be initialized to the lowest value at the beginning of each beam-scan duration.

In one embodiment, in the Method 1/2, a RA-RNTI used for DL control channel transmission/detection for RAR scheduling may be determined differently based on the number N of repeatedly transmitted RA signals. Further, a starting point of the RAR window corresponding to the RA signal transmission may also be configured differently based on the N value. In one embodiment, when the RA signal transmission resource (for example, SF or OS) and the RAR receiving resource (for example, SF or OS) overlap with each other at the same time point (for example, at the same SF timing or the same OS index), the user equipment may be operable to perform only detection/reception of RAR on the corresponding resource/time (with skipping/abandoning the RA signal transmission). Otherwise, when the RA signal transmission resource (for example, SF or OS) and the RAR receiving resource (for example, SF or OS) do not overlap with each other at the same time point (for example, the same SF timing or the same OS index), the UE may perform the RA signal transmission operation and the RAR reception/monitoring operation independently.

In one embodiment, when different RA signal resources as identified (in a TDM form) on the time domain are configured between base station TX-beam IDs (or sync signal transmission symbol indices corresponding to the base station TX-beam IDs), the user equipment may also operate to select its own optimal UE RX-beam ID (and an optimal BS (base station) TX-beam ID) over a plurality of sync signal transmission SFs before attempting the actual initial access. For this purpose, for the sync signal, the TX-beam direction (for example, beam ID or index) (or TX-antenna port combination) of the base station may be swept on a predetermined duration (for example, beam-scan duration) basis. Further, the index of the RA signal resource may be determined using the base station TX-beam ID (or a sync signal transmission symbol index corresponding to each base station TX-beam ID).

This method may be combined with a method for scanning the user equipment (UE) TX-beam. Specifically, N RA signals within the same beam-scan duration may be transmitted in the same UE TX beam direction (for example, the same beam ID or index). N RA signals within different beam-scan durations may be transmitted in different UE TX beam directions (for example, different beam IDs or indices). That is, in the case of the Method 1, the user equipment (UE) Tx beam changes on a repeated RAS basis. The same user equipment (UE) Tx beam may be applied to RA signals in the same repeated RAS. For the above Method 2, the Tx beam may vary on a set of consecutive N one-RAS SFs basis. The same user equipment (UE) Tx beam may be applied to the RA signals in the same set of consecutive N one-RAS SFs.

For User equipment (UE) TX-beam scanning, the UE configures a multiple RA signal and repeatedly transmits the signal within a predetermined duration.

For the purpose of TX-beam scanning by the user equipment, the UE may operate to repeatedly N times transmit a RA signal configured using the same UL resource (for example, the same sequence/code and/or frequency resource) within a predetermined (time) duration (hereinafter, beam-scan duration) (N>1). In this connection, the UE may operate to transmit RA signals within the beam-scan duration based on different TX-beam formations (using different antenna port combinations). In this connection, the beam-scan duration may be configured using a number of subframes (i.e., SFs) and a plurality of OFDM symbols (i.e., OSs). The number N of RA signals as repeatedly transmitted within the beam-scan duration may be signaled to the user equipment via transmission of system information such as PBCH/SIB (at the initial access stage). Alternatively, the number N may be dynamically indicated via an RA signal transmission command signal, such as a PDCCH order (in the RRC connected state). In this connection, N represents the number of the TX beam directions (for example, beam IDs or indices) (or TX-antenna port combinations) of the UE. TX beam directions may vary between the N RA signals as transmitted from the user equipment within a single beam-scan duration. Further, the power ramping (i.e., power increase) for the RA signal transmission may be performed as follows: (i) the ramping may be performed on a beam-scan duration basis, similar to the Method 1 above (In this connection, the transmit powers for RA signals within the same duration are all configured to remain the same); (ii) the ramping may be performed on a RA signal basis regardless of the beam-scan duration.

In one embodiment, when the (maximum) number of different TX beam directions which the user equipment may form is defined as M, the M may have a value equal to or different from N, which is the number of resources for RA signal transmission within a single beam-scan duration, which is configured by the base station. The following user equipment operations may be configured depending on the relationship between N and M.

(a) When M is Smaller than N (M<N)

The user equipment may transmit RA signals using all of the N resources. In this connection, the UE may be operable to apply M different TX beam directions cyclically to the corresponding N RA signals. Alternatively, the UE may randomly select M resources out of the N total resources and transmit the RA signal using the selected resources. In this case, the UE may operate to apply M different TX beam directions to the corresponding M RA signals.

(b) When M is Equal to N (M=N)

The user equipment may transmit the RA signal using all N (=M) resources. In this case, the UE may operate to apply M different TX beam directions to the corresponding M RA signals.

(c) When M is Greater than N (M>N)

The user equipment may transmit RA signals using all of the N resources. In this case, the UE may randomly select N TX beam directions out of all M different TX beam directions. The UE may then operate to apply each of the selected TX beam directions to each of the corresponding N RA signals.

Further, in addition to the number N of resources for RA signal transmission within a single beam-scan duration, the maximum number K of resources that a single user equipment can use for RA signal transmission within the single beam-scan duration may be configured from the base station (in this connection, K may be equal to or smaller than N). In this case, the following user equipment operation may be configured.

(a) When M is Smaller than K (M<K)

The user equipment randomly selects K resources out of N total resources and transmits the RA signal using all of the corresponding selected K resources. In this case, the UE may be operable to apply M different TX beam directions in a cyclic manner to the corresponding K RA signals. Alternatively, the UE may randomly select M resources out of N total resources, and transmit RA signals using the selected resources. In this case, the UE may operate to apply M different TX beam directions to the corresponding M RA signals.

(b) When M is Equal to K (M=K)

The user equipment may randomly select K resources out of all N resources and transmit RA signals using all of the corresponding selected K (=M) resources. In this case, the UE may operate to apply M different TX beam directions to the corresponding M RA signals.

(c) When M is Greater than K (M>K)

The user equipment randomly may select K resources out of all N resources and transmit RA signals using all of the corresponding K selected resources. The UE may randomly select K TX beam directions out of all M different TX beam directions and apply each of the selected K TX beam directions to each of the corresponding K RA signals.

In one embodiment, when different RA signal resources as identified (in a TDM form) on the time domain are configured between base station TX-beam IDs (or sync signal transmission symbol indices corresponding to the base station TX-beam IDs), the user equipment may also operate to select its own optimal UE RX-beam ID (and an optimal BS (base station) TX-beam ID) over a plurality of sync signal transmission SFs before attempting the actual initial access. For this purpose, for the sync signal, the TX-beam direction (for example, beam ID or index) (or TX-antenna port combination) of the base station may be swept on a predetermined duration (for example, beam-scan duration) basis. Further, the index of the RA signal resource may be determined using the base station TX-beam ID (or a sync signal transmission symbol index corresponding to each base station TX-beam ID). Next, the UE transmits the RA signal N times using the RA signal resource linked to/configured based on the optimal base station TX-beam ID. In this case, RA signal (resource) transmissions may be performed based on different N user equipment (UE) TX-beam IDs (including an optimal user equipment RX-beam ID). In this connection, the optimal ID may mean the ID with the best (received) signal quality. The base station may then indicate via RAR or Msg4 to the user equipment which of the received N RA signals was optimal from the base station's point of view. The user equipment may perform all of subsequent UL signal/channel (for example, PUSCH, PUCCH, SRS) transmissions using the TX-beam ID corresponding to the optimal RA signal transmission (that is, which has been generated in the transmission of the corresponding RA signal) (until the ID is updated again).

Figure 15:
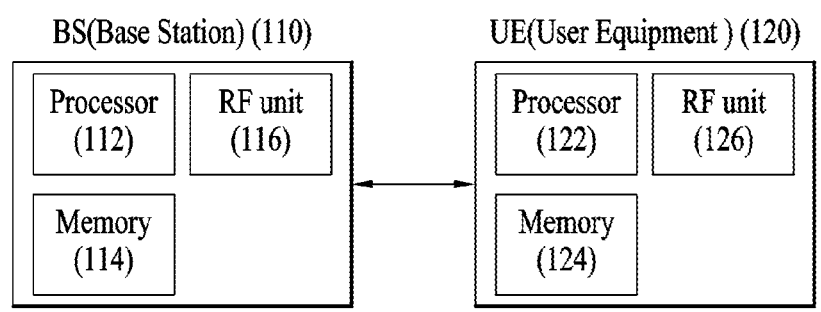
FIG. 15 illustrates a base station and a user equipment applicable to an embodiment of the present invention.

FIG. 15 illustrates a BS and a UE of a wireless communication system, which are applicable to embodiments of the present invention.

Referring to FIG. 15, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

What is claimed is:

1. A method for transmitting a signal by a user equipment (UE) in a wireless communication system, the method comprising:
   transmitting N (N>1) first random access (RA) signals during a first duration;
   monitoring a random access response (RAR) for the first RA signals; and
   when the monitoring of the RAR is failed, transmitting N second RA signals during a second duration,
   wherein the first RA signals transmitted during the first duration are transmitted in a first transmit beam direction, and the second RA signals transmitted during the second duration are transmitted in a second transmit beam direction different from the first transmit beam direction,
   wherein information on a number of RA signals within each of the first and second durations is received by the UE based on system information, when the UE is in an initial access procedure,
   wherein the information on the number of RA signals within each of the first and second durations is received by the UE based on control information, when the UE is in a Radio Resource Control (RRC) connected state,
   wherein a size of a RAR window in the first duration is based on whether resources allocated for the RA signals within the first duration are consecutive,
   wherein a size of a RAR window in the second duration is based on whether resources allocated for the RA signals within the second duration are consecutive,
   wherein, when the allocated resources for the RA signals within the first duration are consecutive, the RAR window size in the first duration is proportional to a number of the RA signals within the first duration, and
   wherein, when the allocated resources for the RA signals within the second duration are consecutive, the RAR window size in the second duration is proportional to a number of the RA signals within the second duration,
   wherein, when the allocated resources for the RA signals within the first duration are not consecutive, the RAR window size in the first duration is inversely proportional to a number of the RA signals within the first duration, and
   wherein, when the allocated resources for the RA signals within the second duration are not consecutive, the RAR window size in the second duration is inversely proportional to a number of the RA signals within the second duration.

2. The method of claim 1,
   wherein transmission powers for RA signals within the same duration are the same, and
   wherein the transmission power for the second RA signals in the second duration is higher than the transmission power for the first RA signals in the first duration.

3. The method of claim 1, wherein the RAR is individually monitored for each RA signal transmission.

4. The method of claim 3, wherein when a response signal to a K-th (K<N) RA signal transmission in the second duration is successfully received, transmissions of RA signals after to the K-th RA signal transmission within the second duration are skipped.

5. The method of claim 1, wherein a resource used for transmission of each RA signal is configured based on a base station (BS) transmit beam ID obtained from the BS.

6. The method of claim 1, wherein a RA signal includes a Physical Random Access Channel (PRACH).

7. A user equipment (UE) for transmitting a signal in a wireless communication system, the UE comprising:
   a radio frequency (RF) module including a transceiver; and
   a processor, wherein the processor is configured to:
   transmit N (N>1) first random access (RA) signals during a first duration;
   monitor a random access response (RAR) for the first RA signals; and
   when the monitoring of the RAR is failed, transmit N second RA signals during a second duration,
   wherein the first RA signals transmitted during the first duration are transmitted in a first transmit beam direction, and the second RA signals transmitted during the second duration are transmitted in a second transmit beam direction different from the first transmit beam direction,
   wherein information on a number of RA signals within each of the first and second durations is received by the UE based on system information, when the UE is in an initial access procedure,
   wherein the information on the number of RA signals within each of the first and second durations is received by the UE based on control information, when the UE is in a Radio Resource Control (RRC) connected state,
   wherein a size of a RAR window in the first duration is based on whether resources allocated for the RA signals within the first duration are consecutive,
   wherein a size of a RAR window in the second duration is based on whether resources allocated for the RA signals within the second duration are consecutive,
   wherein, when the allocated resources for the RA signals within the first duration are consecutive, the RAR window size in the first duration is proportional to a number of the RA signals within the first duration, and
   wherein, when the allocated resources for the RA signals within the second duration are consecutive, the RAR window size in the second duration is proportional to a number of the RA signals within the second duration, wherein, when the allocated resources for the RA signals within the first duration are not consecutive, the RAR window size in the first duration is inversely proportional to a number of the RA signals within the first duration, and wherein, when the allocated resources for the RA signals within the second duration are not consecutive, the RAR window size in the second duration is inversely proportional to a number of the RA signals within the second duration.

8. The UE of claim 7,
wherein transmission powers for RA signals within the same duration are the same, and
wherein the transmission power for the second RA signals in the second duration is higher than the transmission power for the first RA signals in the first duration.

9. The UE of claim 7, wherein the RAR is individually monitored for each RA signal transmission.

10. The UE of claim 9, a response signal to a K-th (K<N) RA signal transmission in the second duration is successfully received, transmissions of RA signals after the K-th RA signal transmission within the second duration are skipped.

11. The UE of claim 7, wherein a resource used for transmission of each RA signal is configured based on a base station (BS) transmit beam ID obtained from the BS.

12. The UE of claim 7, wherein a RA signal includes a Physical Random Access Channel (PRACH).

* * * * *